United States Patent [19]

Thoma

[11] 4,404,705
[45] Sep. 20, 1983

[54] CAR WINDOW DEFROSTER

[76] Inventor: Klaus D. Thoma, Twelve Greenway Plaza, Suite 1200, Houston, Tex. 77046

[21] Appl. No.: 250,610

[22] Filed: Apr. 3, 1981

[51] Int. Cl.³ .............................................. A47L 5/14
[52] U.S. Cl. .................................. 15/313; 15/236 R; 15/401; 15/405; 37/230; 239/129
[58] Field of Search ................. 15/313, 401, 405, 396, 15/397, 236 R; 37/230; 239/129, 130

[56] References Cited

U.S. PATENT DOCUMENTS

| 695,967 | 3/1902 | Thurman | 15/405 X |
|---|---|---|---|
| 1,298,200 | 3/1919 | Görgey | 37/230 |
| 1,378,577 | 5/1921 | Bahrenburg | 15/405 X |
| 1,468,541 | 9/1923 | Nagues | 15/405 X |
| 1,773,051 | 8/1930 | Marenti | 15/313 X |
| 2,096,023 | 10/1937 | Albertson | 15/405 X |
| 2,711,552 | 6/1955 | Lengyel | 15/236 R |
| 3,248,133 | 4/1966 | Michnoff | 37/230 |
| 3,816,863 | 6/1974 | Thielemann | 15/236 R X |

Primary Examiner—Chris K. Moore

[57] ABSTRACT

A hand-held scraping device for de-icing frozen car windows utilizing the exhaust fumes emitted through the car's tail pipe for softening or melting the layer of ice wherein a flexible hose is clamped over the free end of the tail pipe, the exhaust fumes conducted through the flexible hose to a scraper head attached to a handle section of the flexible hose, in which the exhaust fumes distributed through either a number of frontal circular outlets over a flat plastic scraping strip, or through a narrow continuous rectangular outlet behind an inclined front wall equipped with a plastic scraping strip, with optional vertical outlet strips or openings through the bottom wall of either version of the scraper head for additional distribution of the hot gases onto the windshield.

4 Claims, 3 Drawing Figures

CAR WINDOW DEFROSTER

TECHNICAL FIELD

This invention relates to automobile windshield scrapers and more particularly to a window scraper for removing snow and ice from car windows which utilizes the waste heat remaining in car exhaust fumes for removing frozen snow and ice from car windows while the car's engine is idling or warming up.

BACKGROUND ART

In winter time in colder climates car owners commonly encounter ice and snow on their front and rear car windows if their car is left outside for a sufficient length of time. For this reason, some cars nowadays come equipped with optional rear window heaters, usually in the form of electrically resistive wires implanted between the window's glass panels. This heating up process is a slow one, however, and many drivers are forced to resort to manual scraping if the rear window must be cleared quickly. Such electrical heating devices are, therefore, more commonly used as de-foggers than de-icers. Iced-up front windshields are an even greater problem for motorists and generally speaking such layers must be removed manually through vigorous scraping and scratching.

The present invention solves these problems utilizing a source of waste heat readily available during the warm-up and preparatory stages of winter driving.

SUMMARY OF THE INVENTION

The waste heat escaping through the exhaust pipe of an automobile is captured in a flexible plastic hose which is removably attached to the exhaust pipe itself and conducted in this hose to the window which needs to be thawed. The distal or free end of the plastic hose is further provided with a flat end section through which the exhaust fumes are distributed onto the windshield. This flat end section is shaped in the form of a conventional scraper such that the thawing and scraping action can be combined for swift, effortless removal of even thick layers of ice while the car's engine is being warmed up prior to driving off.

DESCRIPTION OF THE PREFERRED EMBODIMENT

In wintertime, a car's engine is generally warmed up briefly in idle or higher rpm ranges while the car is still stationary. During this period of time, the present invention provides for an exhaust heat assisted window scraper which enables the driver, after a simple, quick installation, to remove snow and ice from the car windows in substantially less time and with considerably less physical effort than customary scrapers or brushes.

Figure 1:
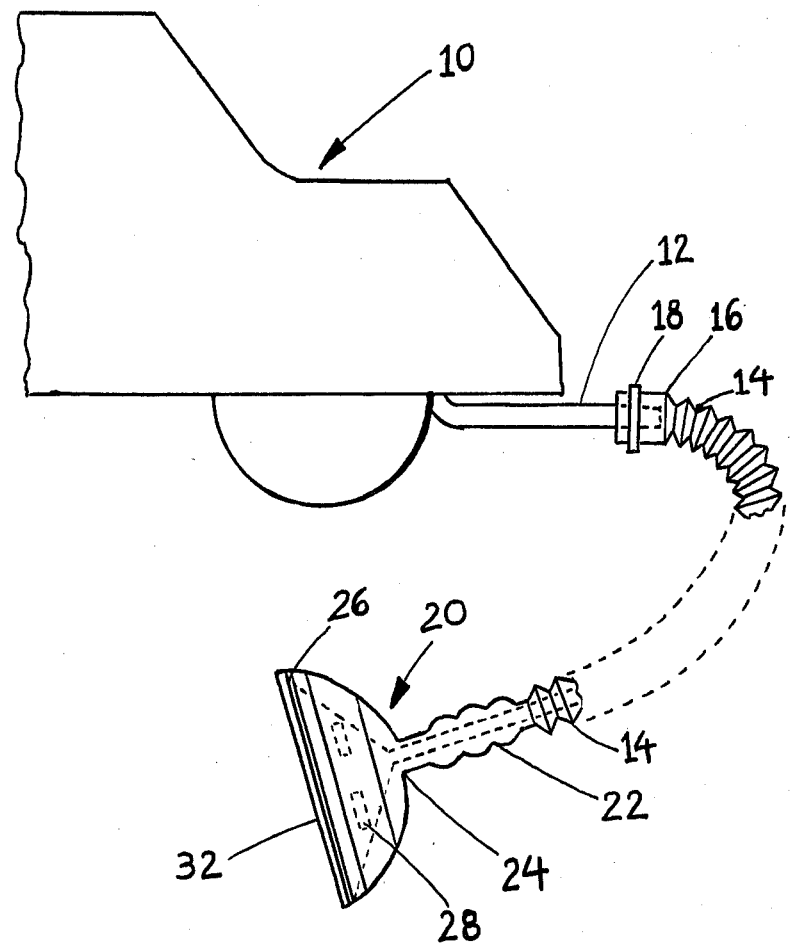
FIG. 1 is a schematic view of the preferred embodiment of the present invention (not to scale).

Referring now to FIG. 1, the exhaust pipe 12 of an automobile 10 (not shown in detail) is shown as being connected to a flexible hose 14 by means of female end portion 16 of hose 14 being sealingly clamped onto exhaust pipe 12 with the help of quick-connect or screw clamp 18. Flexible hose 14 is preferably made of plastic or rubber material of sufficient strength to withstand the temperature of the exhaust fumes, having good thermal insulating properties to minimize the loss of exhaust fume heat during the journey through the hose, and having sufficient flexibility to permit easy reach and scraping of the various windows of automobile 10. A metal-lined PVC hose, for example, possesses the above-referred to properties.

The proximate end of hose 14 terminates in a cylindrical, socket-like end piece 16 large enough to fit over the commonly encountered exhaust pipe types and sizes for automobiles. To assure tight, sealing fit over exhaust pipe 12, connector portion 16 is clamped down with the help of quick-connect coupling 18 of the clamp or set-screw type of conventional design.

The distal end of hose 14 is provided with a heat distributing scraping head generally indicated by reference numeral 20. Scraper 20 comprises a reinforced handle section 22 which further insulates hose 14 such that scraper 20 does not become too hot for human touch even if the car's engine is revved up for high flow-through and elevated temperatures. Handle section 22 may be made of wood but may also consist of merely a thickened portion of hose 14 made of the same material.

Figure 2:
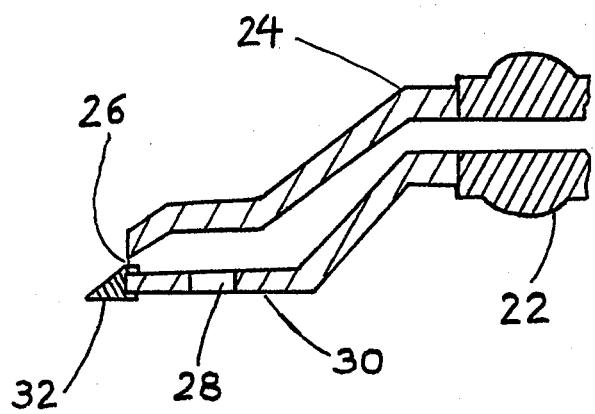
FIG. 2 is a side elevational cross-section through one embodiment of the scraper portion of the de-icing device of the present invention.

Referring now both to FIG. 1 and FIG. 2, one embodiment of the present invention is shown with scraper 20 further comprising a generally T-shaped funnel head 24 which distributes the exhaust fumes over a wider but narrower cross-sectional area through frontal outlet 26 as well as optional bottom outlets of, rectangular shape 28, or circular shape (not shown) provided within scraper head base plate 30. Funnel head 24 and its bottom wall 30 are preferably made of a metal having good heat conducting properties, such as, for example, aluminum. To avoid damage to the windshield itself, metal bottom wall 30 is provided with a short frontal plate 32 of plastic material which is used for the scraping action proper.

Figure 3:
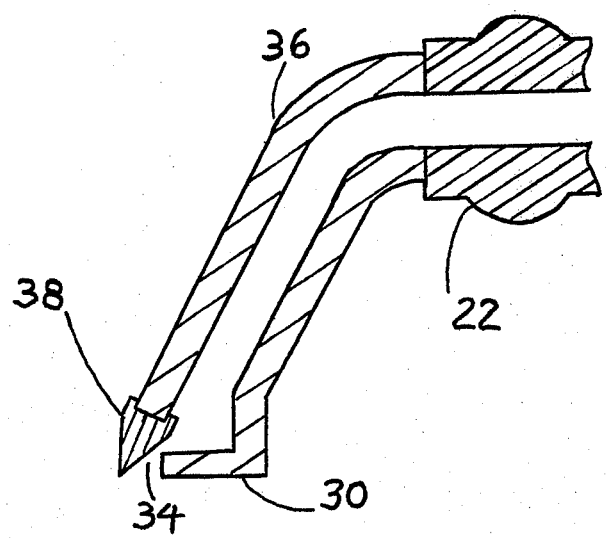
FIG. 3 is a side elevational cross-section through another embodiment of the scraper portion of the de-icing device of the present invention.

Referring now to FIG. 3, a somewhat different embodiment of the scraper portion of the present invention is shown as having a steeply inclined front wall 36, a rear wall terminating in bottom wall 30, and a continuous, narrow, generally rectangular outlet strip 34 between them. The lower end of front wall 36 is again provided with a short frontal plate 38 of plastic material which is used for pushing and scraping the softening ice.

In operation, the de-icing device of the present invention is first of all removed from storage, such as the trunk of the car where it is transported in a space-saving folded condition; connector end 16 is then attached to exhaust pipe 12 and tightened down with the help of clamp 18. Thereafter, the car's engine is started and, during the warm-up period generally provided in the winter, the engine's exhaust fumes, which are always warmer than ambient temperatures and quickly heating up as the engine reaches operating temperatures, are conducted through hose 14 to scraping head 20. Scraping head 20 is then applied to the car's windows and the ice and snow removed therefrom through a combination of the melting action of warm exhaust fumes streaming through outlets 26, 28 and 34, respectively, and the mechanical scraping forces applied to the windshield through brushing plates 32, 38, respectively. When all the ice has been melted and removed, it may be necessary to briefly wipe the windshield dry or to activate the car's windshield wipers so as to remove any dirt which has been carried by the exhaust fumes and deposited on the glass, as well as to avoid quick freezing over of the wet glass panel. Thereafter, clamp 18 is loosened, hose 14 removed from exhaust pipe 12, and the entire device may be rolled up and stored again for re-use as needed.

Because many and varying embodiments may be made within the scope of the invention concept taught herein and because many modifications may be made in the embodiment described in detail herein in accordance with the requirements of the law, it should be understood that such details are to be taken as illustrative and not in a limiting sense.

I claim:

1. A hand-held scraping device for de-icing frozen car windows utilizing the exhaust fumes emitted through the car's tail pipe for softening or melting the layer of ice, comprising:
    hose means for conducting said exhaust fumes from said tail pipe to said window;
    connecting means for removably and sealingly clamping one end of said hose means to said tail pipe;
    scraping means connected to the other end of said hose means for distributing said exhaust fumes onto said window and for removing the softened-up layer of ice from said window, said scraping means including a handle portion and a broad and flattened head portion; and
    exhaust fume outlet means through said flattened head portion for directing said fumes onto the ice covering said window, said exhaust fume outlet means including a continuous narrow, generally rectangular outlet strip between the bottom and front walls of said flattened head portion and one or more openings in the bottom wall of said flattened head portion.

2. The device of claim 1 wherein said flattened head portion further includes a plastic scraping strip attached to the front end of the bottom wall of said flattened head portion.

3. The device of claim 1 wherein said flattened head portion further includes a plastic scraping strip attached to the lower end of the front wall of said flattened head portion.

4. A hand-held scraping device for de-icing frozen car windows utilizing the hot exhaust fumes emitted through the car's tail pipe for softening and melting the layer of ice, comprising:
    hose means for conducting said hot exhaust fumes from said tail pipe to said window;
    connecting means for removably and sealingly clamping one end of said hose means to said tail pipe; and
    scraping means connected to the other end of said hose means for distributing said exhaust fumes onto said window and removing the softened layer of ice from said window, said scraping means including a handle portion, a broad and flattened head portion and exhaust fume outlet means including one or more small, generally circular openings in the bottom wall of said flattened head portion for directing said fumes onto the ice covering said window.

* * * * *